July 22, 1952  C. S. BATCHELOR ET AL  2,604,425
REINFORCED BRAKE LINING AND METHOD OF MAKING SAME
Filed Nov. 29, 1946
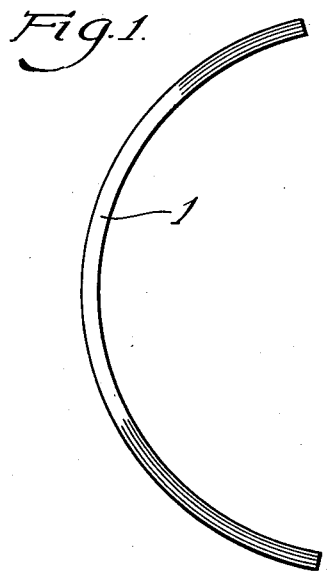
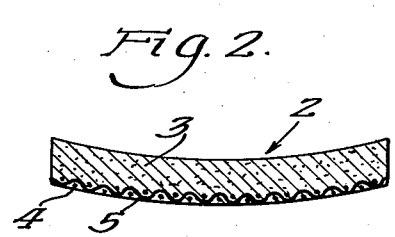
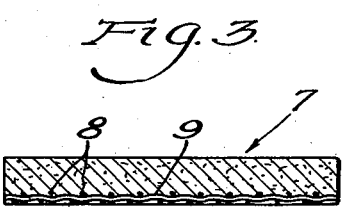
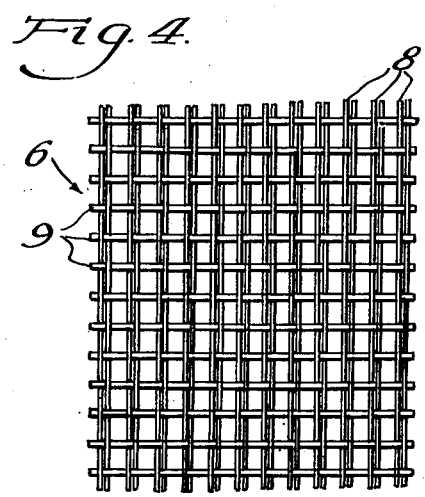
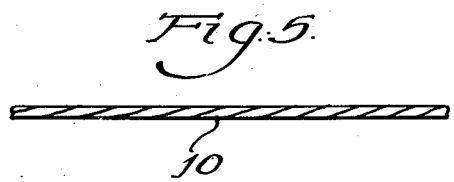
Inventors:
Clyde S. Batchelor
Henry J. Cofek
Frederick S. Walker
By Lee J. Gary
Attorney Patented July 22, 1952

2,604,425

UNITED STATES PATENT OFFICE 2,604,425

REINFORCED BRAKE LINING AND METHOD OF MAKING SAME

Clyde S. Batchelor, Henry J. Cofek, and Frederick S. Walker, Bridgeport, Conn., assignors to Raybestos-Manhattan, Inc., Passaic, N. J., a corporation of New Jersey Application November 29, 1946, Serial No. 712,848

13 Claims. (Cl. 154—81)

1

This invention relates to improvements in brake linings of the segmental type and a method of making the same, and refers particularly to a brake lining of the molded or extruded type having a heat hardenable binder and a reinforced back.

In the manufacture of brake linings of the class described it has been found that the usual friction material having a heat hardenable binder shrinks, that is, permanently reduces dimensions during the period when it is subjected to temperatures necessary to harden the material. In addition, it is frequently necessary to reinforce such linings, and this has heretofore been accomplished by embedding a metallic mesh in the rear or concave face of the lining.

In hardening or curing said linings the same are subjected to elevated temperatures for a predetermined period of time found necessary to drive off volatiles, oxidize binders and accomplish the necessary complex reactions which go to harden the friction material.

In view of the inherent characteristics of such materials to shrink at the hardening temperatures employed and the tendency of the metallic reinforcing strands to expand at the same time, it has been found that the segments warp, the internal stresses exhibiting themselves by a strain or deformation characterized in that the segment buckles transversely with the unreinforced or working side concave and the reinforced or inner side convex. This condition necessitates excessive grinding of the face of the segment which, of course, is a wasteful and laborious process.

A somewhat similar condition also exists during usage or operation of the brake lining, particularly where the lining has not been completely cured. During severe usage where heat at high temperature is generated, additional shrinkage of the lining sometimes takes place augmented by the expansion of the transverse reinforcing strands. Consequently, transverse warpage is likely to occur, resulting in high spots or hard spots on the lining and maldistribution of frictional forces.

As a feature of our invention we incorporate a reinforcing material, preferably a mesh material having non-metallic transverse strands constructed of a material which also shrinks at the hardening or curing temperature of the friction material. By the incorporation of such material the shrinkage of the friction material per se is compensated for by the shrinkage of the transverse reinforcing strands and the stresses are, hence, balanced or overbalanced, if desired, and

2 no warpage, or warpage in the reverse direction takes place when the segment is being hardened.

Other features and objects of our invention will be apparent from the accompanying drawing and following detailed description.

In the drawing, Fig. 1 is an elevational view of the usual segmented brake lining.

Fig. 2 is a transverse sectional view of a segmental brake lining having an all-metallic reinforcing mesh embedded therein.

Fig. 3 is a similar view of a similar lining having non-metallic transverse strands of reinforcing material which have shrinkage characteristics at hardening or curing temperatures.

Fig. 4 is a fragmentary view of a mesh reinforcing material constructed in accordance with the concepts of our invention.

Fig. 5 is an enlarged view of one form of non-metallic cross strand found suitable in our invention.

Referring in detail to the drawing, 1 indicates a segmental brake lining which is constructed of a friction material having a heat hardenable binder. Our invention has specific application to the molded or extruded type of brake lining or in general to those types of lining which rely for strength upon a heat hardenable binder.

This type of friction material is best exemplified by the asbestos-filler-binder type of lining, the binder being generally composed of a drying oil, a more or less small amount of rubber and a solvent. As a typical example of a friction material of this class is one composed of fiber, drying oil, rubber solids, hydrocarbon solvent, lubricants, fillers, sulfur and friction agents. This type of binder, when used, is heat hardened or cured and when subjected to hardening temperature tends to shrink to permanently reduced dimensions. Consequently, where used in the specification or claims, "shrinkage" refers to the condition where dimensional reduction takes place when the lining is subjected to heat at a temperature of the order necessary to harden or cure the binder. This degree of temperature is encountered during the manufacture of the brake lining and may also be met with in the operation or usage of the lining.

For purposes of further example, the above described friction material is treated or handled in a manner similar to that described in the pending application for United States Letter Patent filed in the names of Novak and Cofek, Serial No. 598,423, now abandoned, to produce a loose mass of small pellets or nodules of fibres, sometimes characterized as being of a granular nature, and flowed by gravity between a pair of rolls which compact and shape the mass and continuously discharge the same in the form of a strip of material of a densified nature. The composition of the class hereinbefore described, particularly when the rubber content thereof is low, requires reinforcement and support, especially during the initial handling stages and subsequent curing or hardening stages and for this purpose, as the compacted material is extruded between the rolls, there is simultaneously embedded in one face thereof a woven mesh reinforcement.

Such reinforcements, heretofore have usually comprised a woven wire mesh having wire for both the warp and weft strands, as shown particularly in Fig. 2, wherein 2 indicates a portion of a segmental brake lining composed of a friction material 3 and woven longitudinal strands 4 and cross strands 5 of wire.

When the element 2 is heated to cure or harden the binder, the friction material tends to shrink. Simultaneously, the cross strands 5 tend to expand, setting up internal stresses in the element which result in the same being "dished" transversely, that is, the working face becomes transversely concave and the rear face, or longitudinally concave face of the segment becomes transversely convex. This, of course, requires that the working face be ground, or if not ground, high spots or hard spots develop during usage.

In accordance with our invention a reinforcement 6 is embedded in the rear or concave face of a segmental brake lining 7, the reinforcement comprising a woven structure including longitudinal metal strands 8 and transverse non-metallic strands 9. The strands 9 are so constructed or comprise a material which when heated to temperatures in the neighborhood of the hardening temperature of the friction material will shrink, that is, exert a tensile force which opposes the shrinkage of the friction material per se.

When the friction element 7 is subjected to hardening temperature, the stress due to the shrinkage of the friction material per se, is resisted by the stress due to the shrinkage of the strands 9 and as a consequence the element 7 is prevented from buckling concave transversely, as was the case with the element 2. It is contemplated that the strands be of sufficient number, cross-sectional area and possess sufficient latent shrinkage properties as to balance the shrinkage stress of the friction material per se, or that the strand shrinkage stress be slightly greater than the shrinkage stress produced by the friction material, in which case the element 7 may be buckled slightly convex transversely. This latter condition is not particularly troublesome in the use of segmental brake linings.

As an example of the type of material comprising the cross strands 9, nylon may be used either as monofilaments or yarn. Nylon possesses the property of contracting when subjected to temperatures in the hardening temperature range of the friction material; the major portion of the hardening or curing taking place between about 200° and 300° F., within which range nylon also shrinks.

Another material which can be employed for the strands 9 comprises twisted paper, particularly kraft paper, as shown best at 10 in Fig. 5. It is believed that the twisting, which imparts tension to the paper, augments the normal tendency of a paper cord or strand to contract when the same is heated. At least, such a material when used as the cross-strands eliminates the condition illustrated in Fig. 2, when the segment is cured or hardened.

To use the twisted paper strands 10, it is preferred that a mesh structure be formed comprising wire warp strands and twisted paper filler strands, as illustrated in Fig. 4. To facilitate the handling of the mesh or screen so formed, the same, after weaving, is coated with an alkyd resin or other type resin as described in the patent to D. H. Miller et al., No. 2,403,674.

In view of the fact that the resin coating is baked after application of said coating to the mesh, a degree of latent shrinkage of the transverse strands may be lost. However, in the manufacture of brake linings, if the baking temperature of the resin on the mesh is maintained not materially above 200° F., sufficient latent shrinkage of the cross-strands will be retained to resist or overpower the inherent shrinkage of the friction material per se during hardening or cure. It is essential that the cross-strands during hardening or cure be capable of shrinking at least one-half percent of their length. Preferably, the shrinkage should be of the order of about two and one-half percent, although shrinkage as high as ten percent may not be excessive, particularly in those uses where overbalance of the stresses is desired in favor of the strands.

In addition to having characteristics of shrinkage at hardening or curing temperatures, the transverse strands, particularly where used as a prefabricated mesh should have sufficient strength and stiffness to be woven, and if the material is extruded, to go through the extrusion step without distortion.

In operation, brake linings are frequently heated to relatively high temperatures, depending upon the severity of the use. When reinforced segmental linings are employed having metallic cross-strands as well as metallic longitudinal strands, such heating tends to buckle the lining transversely, due in some instances to an incompletely cured lining and by the presence of the expandible metal cross-strands. The latter is frequently the predominating cause of such buckling even when the lining itself is completely cured, and the buckling is always such as to have the working face warped transversely concave.

In employing our invention such transverse buckling of the working face to a concave contour is not only prevented during hardening or cure but is also prevented during use. Although it is possible that in curing or hardening the latent shrinkage of the transverse strands, may, in some instances be exhausted after such cure or hardening, said strands, unlike metal strands, when in use, do not actively warp the lining and to this extent function in a superior manner to the metallic transverse strands. However, where, in some instances, latent shrinkage is retained in the transverse strands even after cure or hardening, such strands function in operation in a manner as hereinbefore described during curing or hardening.

Of course, it is to be understood that our invention is not intended to be limited to a friction material containing only the specific ingredients hereinbefore set forth, since, broadly, it is directed to use with any friction material which needs extraneous reinforcement by embedded reinforcing members and which has a tendency to shrink during curing, hardening or in use.

We claim as our invention:

1. A method of making a heat hardened reinforced brake lining of the arcuate segmental type having a longitudinal convex and concave face and constructed of a friction material having a heat hardenable binder which shrinks at hardening temperatures comprising, embedding a reinforcing material in said segment comprising longitudinal portions and portions disposed transversely to the arc of the segment and adjacent the concave face thereof, said transversely disposed portions consisting of strands having characteristics of producing shrinkage stresses transversely of the segment adjacent the concave face thereof at the hardening temperatures of the binder, and hardening said friction material at elevated temperatures with said reinforcing material in situ.

2. A method of making a heat hardened reinforced brake lining of the arcuate segmental type having a longitudinal convex and concave face and constructed of a friction material having a heat hardenable binder which shrinks at hardening temperature comprising, embedding a reinforcing material in said segment consisting of spaced strands transverse to the arc of the segment and adjacent the concave face thereof, said spaced strands of reinforcing material having characteristics of producing shrinkage stresses transversely of the segment adjacent the concave face thereof which at least balances the shrinking stresses produced by the shrinking of the heat hardenable binder at the hardening temperatures of the binder, and hardening said friction material at elevated temperatures with said reinforcing material in situ.

3. A method of making a heat hardened reinforced brake lining of the arcuate segmental type having a longitudinal convex and concave face and constructed of a friction material having a heat hardenable binder which shrinks at hardening temperatures comprising, embedding a reinforcing material in said segment adjacent the concave face thereof comprising spaced strands disposed longitudinally and transversely to the arc of the segment, said transversely disposed spaced strands of reinforcing material having characteristics of producing shrinkage stresses transversely of the segment adjacent the concave face thereof at the hardening temperatures of the binder, at least equal to the stress produced by the shrinkage of the binder, and hardening said friction material at elevated temperatures with said reinforcing material in situ.

4. A method of making a heat hardened reinforced brake lining of the arcuate segmental type having a longitudinal convex and concave face and constructed of a friction material having a heat hardenable binder and which produces shrinkage stresses at hardening temperatures comprising, embedding a reinforcing material in said segment comprising spaced longitudinal strands and spaced strands transverse to the arc of the segment and adjacent the concave face thereof, said spaced transverse strands consisting of reinforcing material being so disposed and having characteristics of shrinking at the hardening temperatures of the binder such as to produce counter shrinkage stresses, greater than those of the friction material, and hardening said friction material at elevated temperatures with said reinforcing material in situ.

5. A method of making a heat hardened reinforced brake lining of the arcuate segmental type having a longitudinal convex and concave face and constructed of a friction material having a heat hardenable binder which shrinks and produces shrinkage stresses at hardening temperatures comprising embedding a mesh reinforcing material in said segment consisting of portions disposed longitudinally and transversely to the arc of the segment and adjacent the concave face thereof, said transversely disposed portions being so conditioned and having characteristics of shrinking at the hardening temperatures of the binder such as to produce shrinkage stresses counter to those of the binder, and hardening said friction material at elevated temperatures with said reinforcing material in situ.

6. A method of making a heat hardened reinforced brake lining of the arcuate segmental type having a longitudinal convex and concave face and constructed of a friction material having a heat hardenable binder which shrinks and produces transverse tension at hardening temperatures consisting of embedding a reinforcing material in said segment having metallic portions extending longitudinal of the arc of the segment and non-metallic portions extending transversely to the arc of the segment adjacent the concave face thereof, said transversely disposed portions being so positioned and having characteristics of shrinking at the hardening temperatures of the binder such as to produce tension stresses counter to the binder tension stresses, and hardening said friction material at elevated temperatures with said reinforcing material in situ.

7. A method of making a heat hardened reinforced brake lining of the arcuate segmental type having a longitudinal convex and concave face and constructed of a friction material having a heat hardenable binder and which shrinks and produces shrinkage stresses transversely of the lining at hardening temperatures comprising, embedding a mesh reinforcing material in said segment consisting of metallic strands extending substantially longitudinally of the arc of the segment and non-metallic cross strands extending transversely to said arc adjacent the concave face thereof, said cross strands being so disposed and having characteristics of shrinking at the hardening temperatures of the binder such as to produce transverse shrinkage stresses adjacent the concave face of the brake lining, and hardening said friction material at elevated temperatures with said reinforcing material in situ.

8. A method of making a heat hardened reinforced brake lining of the arcuate segmental type having a longitudinal convex and concave face and constructed of a friction material having a heat hardenable binder and which shrinks and produces transverse shrinkage stresses upon the lining at hardening temperatures which comprises embedding a reinforcing material in said segment consisting of metallic longitudinal strands and strands of organic fibrous material disposed transversely to the arc of said segment and adjacent the concave face thereof said strands of organic fibrous material being so initially conditioned as to produce transverse shrinkage stresses adjacent the concave face of the lining when the binder is subjected to hardening temperatures, and hardening said friction material at elevated temperatures with the organic fibrous strands in situ.

9. A method of making a heat hardened reinforced brake lining of the arcuate segmental type having a longitudinal convex and concave face and constructed of a friction material having a heat hardenable binder and which shrinks and produces shrinkage stresses transversely of the lining at hardening temperatures which comprises, embedding a reinforcing material in said segment consisting of longitudinal metallic strands and strands of paper disposed transversely to the arc of the segment and adjacent the concave face thereof, said paper strands being initially so disposed in said lining and having characteristics of shrinking at the hardening temperature of the binder such as to produce counter transverse shrinkage stresses adjacent the concave face of the lining and hardening said friction material at elevated temperatures with the paper strands in situ.

10. A method of making a heat hardened reinforced brake lining of the arcuate segmental type having a longitudinal convex and concave face and constructed of a friction material having a heat hardenable binder which shrinks and produces shrinkage stresses transversely of the lining at hardening temperatures which comprises, embedding a reinforcing material in said segment adjacent the concave face thereof consisting of longitudinal metallic strands and strands of nylon disposed transversely to the arc of the segment, said nylon strands being initially so disposed and having characteristics of shrinking at the hardening temperature of the binder such as to produce counter transverse shrinkage stresses adjacent the concave face of the lining, and hardening said friction material at elevated temperatures with the nylon strands in situ.

11. An intermediate product in the manufacture of an arcuate segmental brake lining having a longitudinal convex and concave face which comprises heat hardenable friction material which shrinks at hardening temperatures having embedded in the concave face thereof a mesh reinforcing material consisting of continuous longitudinal portions and portions extending transversely to the arc of said segment, said transversely extending portions having characteristics of shrinkage at the hardening temperatures of the friction material, and being so initially tensioned as to produce shrinkage stresses upon the lining when the binder is hardened.

12. An intermediate product in the manufacture of an arcuate segmental brake lining having a longitudinal convex and concave face which comprises heat hardenable friction material which shrinks at hardening temperatures having embedded in the concave face thereof a mesh reinforcing material consisting of metallic members extending substantially longitudinally and substantially continuous non-metallic portions extending transversely to the segment, said transversely extending portions having characteristics of shrinkage at the hardening temperatures of the friction material, and being so initially tensioned as to produce shrinkage stresses upon the lining when the binder is hardened.

13. An intermediate product in the manufacture of an arcuate segmental brake lining having a longitudinal convex and concave face which comprises heat hardenable friction material which shrinks at hardening temperatures having embedded in the concave face thereof a mesh reinforcing material consisting of metallic members extending substantially longitudinally and non-metallic portions extending transversely to and across substantially the entire transverse width of the segment, said transversely extending portions comprising paper strands having characteristics of shrinkage at the hardening temperatures of the friction material, and being so initially tensioned as to produce shrinkage stresses upon the lining when the binder is hardened.

CLYDE S. BATCHELOR.
HENRY J. COFEK.
FREDERICK S. WALKER.

REFERENCES CITED

The following references are of record in the file of this patent:

UNITED STATES PATENTS

| Number | Name | Date |
| --- | --- | --- |
| 1,078,039 | Fisher | Nov. 11, 1913 |
| 2,052,808 | Spokes | Sept. 1, 1936 |
| 2,245,540 | Barr | June 10, 1941 |
| 2,252,554 | Carothers | Aug. 12, 1941 |
| 2,354,389 | Lidkea | July 25, 1944 |
| 2,384,771 | Ryan | Sept. 11, 1945 |
| 2,403,674 | Miller et al. | July 9, 1946 |